United States Patent
Takashima

(10) Patent No.: US 12,067,727 B2
(45) Date of Patent: Aug. 20, 2024

(54) VISIBILITY DETERMINATION SYSTEM, VISIBILITY DETERMINATION METHOD, AND NON-TRANSITORY COMPUTER-READABLE MEDIUM

(71) Applicant: FURUNO ELECTRIC CO., LTD., Hyogo (JP)

(72) Inventor: Yuya Takashima, Hyogo (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 0 days.

(21) Appl. No.: 17/889,372

(22) Filed: Aug. 16, 2022

(65) Prior Publication Data

US 2023/0143999 A1    May 11, 2023

(30) Foreign Application Priority Data

Nov. 11, 2021   (JP) ................ 2021-183930

(51) Int. Cl.
  *G06T 7/12*       (2017.01)
  *B64D 47/08*      (2006.01)
  (Continued)

(52) U.S. Cl.
  CPC .............. *G06T 7/12* (2017.01); *G06T 7/194* (2017.01); *G06V 10/255* (2022.01);
  (Continued)

(58) Field of Classification Search
  CPC . B64D 47/08; G06T 2207/10032; G06T 7/12; G06T 7/194; G06V 10/25;
  (Continued)

(56) References Cited

U.S. PATENT DOCUMENTS

2007/0230800 A1   10/2007   Miyahara
2019/0251371 A1    8/2019   Diedrich et al.
(Continued)

FOREIGN PATENT DOCUMENTS

| JP | 3444192 | 9/2003 | |
|---|---|---|---|
| JP | 4749142 | 8/2011 | |
| NO | 20210870 A1 * | 7/2021 | .............. G01W 1/10 |

OTHER PUBLICATIONS

N. Gulec et al., "Enhancement of vision systems based on runway detection by image processing techniques", Proc. of SPIE, vol. 8360, May 2012, pp. 1-13.
(Continued)

*Primary Examiner* — Christopher S Kelley
*Assistant Examiner* — Ana Picon-Feliciano
(74) *Attorney, Agent, or Firm* — JCIPRNET

(57) ABSTRACT

A visibility determination system determines a visibility condition based on an image taken by a camera. The visibility determination system includes: an acquisition part, configured to acquire a first extracted image obtained by extracting an edge of an imaging target in a first image taken by the camera; and a determination part, configured to determine visibility based on the first extracted image and a second extracted image that is obtained by extracting the edge of the imaging target in a second image taken by the camera at a different time from the first image.

16 Claims, 11 Drawing Sheets

(51) Int. Cl.
  *G06T 7/194* (2017.01)
  *G06V 10/20* (2022.01)
  *G06V 20/10* (2022.01)

(52) U.S. Cl.
  CPC ............ *G06V 20/176* (2022.01); *B64D 47/08* (2013.01); *G06T 2207/10032* (2013.01)

(58) Field of Classification Search
  CPC .. G06V 10/255; G06V 20/176; G06V 20/588; Y02A 90/10
  USPC .......................................................... 348/144
  See application file for complete search history.

(56) References Cited

U.S. PATENT DOCUMENTS

2019/0347778 A1    11/2019  Barkley et al.
2023/0015466 A1*   1/2023   Jiralerspong ....... B60W 40/105
2023/0368357 A1*   11/2023  Smith .................. H04N 23/695

OTHER PUBLICATIONS

"Search Report of Europe Counterpart Application", issued on Apr. 4, 2023, p. 1-p. 10.
"Office Action of Europe Counterpart Application", issued on Feb. 19, 2024, p. 1-p. 10.

* cited by examiner

VISIBILITY DETERMINATION SYSTEM, VISIBILITY DETERMINATION METHOD, AND NON-TRANSITORY COMPUTER-READABLE MEDIUM

CROSS-REFERENCE TO RELATED APPLICATION

This application claims the priority benefit of Japan application serial No. 2021-183930, filed on Nov. 11, 2021. The entirety of the above-mentioned patent application is hereby incorporated by reference herein and made a part of this specification.

BACKGROUND

Technical Field

The disclosure relates to a visibility determination system, a visibility determination method, and a program.

Conventional Art

In an aircraft (moving body) takeoff and landing place such as an airport or a heliport, it is necessary to determine whether visibility of the surroundings is good. Conventionally, the visibility has been confirmed by visual observation by a person present in the takeoff and landing place, and automation of this process is desired.

SUMMARY

The purpose of this disclosure relates to a visibility determination system, a visibility determination method and a program capable of determining visibility based on an image taken by a camera.

A visibility determination system of the disclosure is a system configured to determine a visibility condition based on an image taken by a camera. The visibility determination system may include processing circuitry configured to: acquire a first extracted image obtained by extracting an edge of an imaging target in a first image taken by the camera; and determine visibility based on the first extracted image and a second extracted image that is obtained by extracting the edge of the imaging target in a second image taken by the camera at a different time from the first image.

The processing circuitry is further configured to generate the first extracted image by extracting a first area being a portion of the first image that has been edge-extracted and including the edge of the imaging target, extract a second area being a portion of the second image that has been edge-extracted and corresponding to the first area and determine the visibility based on the first extracted image including the first area and the second extracted image including the second area.

The processing circuitry is further configured to calculate a clarity index of the visibility based on a ratio of number of pixels of the second area in the second extracted image to number of pixels of the first area in the first extracted image.

The processing circuitry is further configured to output a warning signal in response to the clarity index being lower than a clarity index threshold.

The processing circuitry is further configured to output a warning signal in response to the clarity index being lower than a clarity index threshold.

The processing circuitry is further configured to determine the visibility at a plurality of heights of a terrain.

The processing circuitry is further configured to display a poor visibility area based on the visibility corresponding to a plurality of heights of a terrain.

The visibility determination system further includes the camera.

According to this configuration, since the first extracted image and the second extracted image obtained by extracting the edge of the imaging target from the first image and the second image taken at different times by the same camera are used, it is possible to determine the visibility.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DESCRIPTION OF THE EMBODIMENTS

First Embodiment

Hereinafter, a visibility determination system 1 and a data generation system 2 of a first embodiment of the disclosure will be described with reference to the drawings. The visibility determination system 1 (which may be an apparatus) of the first embodiment may determine visibility based on an image taken by a camera. The data generation system 2 may generate determination data used by the visibility determination system 1.

Figure 1:
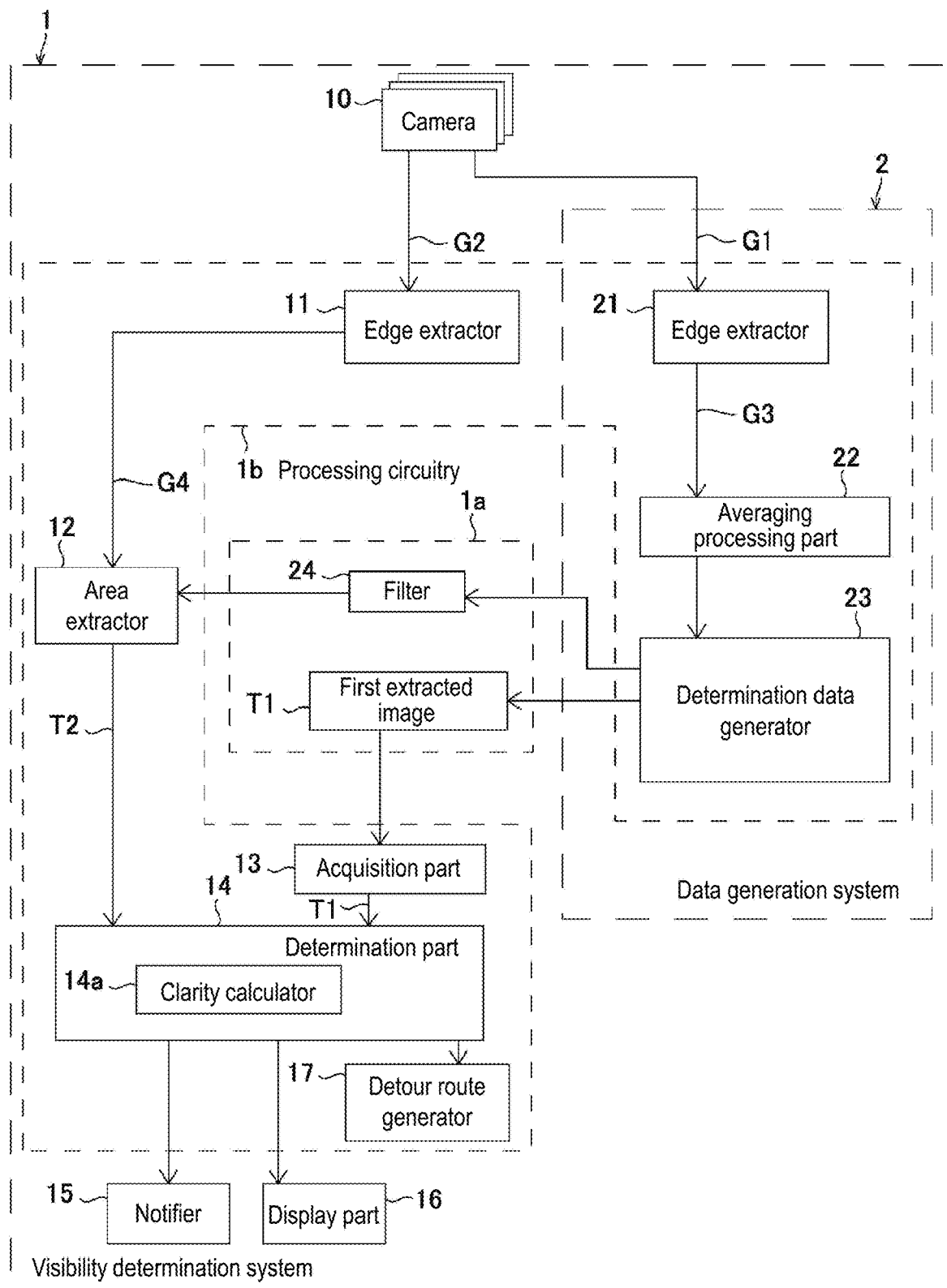
FIG. 1 is a block diagram illustrating a configuration of a visibility determination system of a first embodiment.
Figure 2:
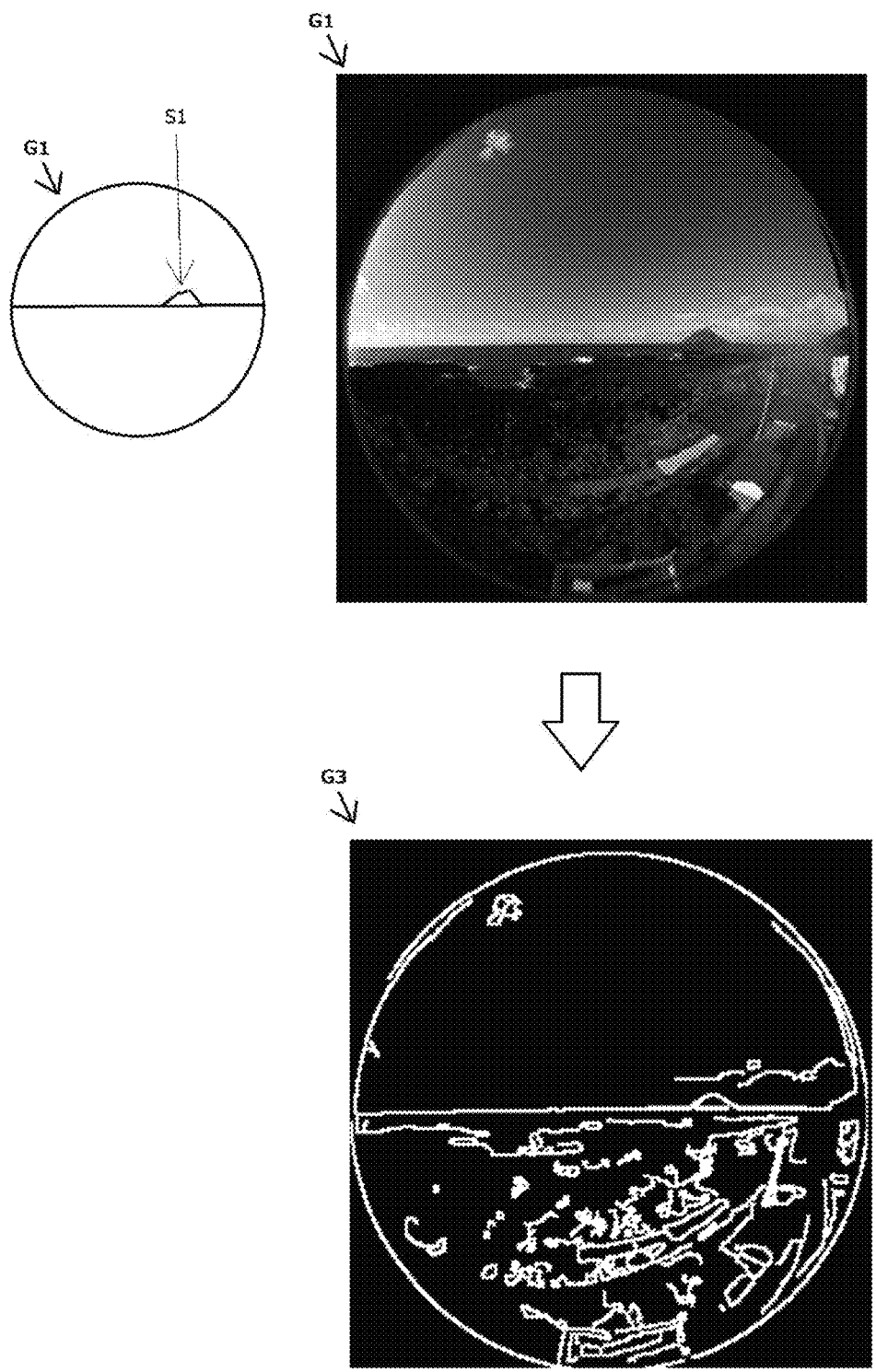
FIG. 2 illustrates an imaging target in a first image, and an image indicating an edge extracted from the first image.

The visibility determination system 1 may be used as an observation system. As illustrated in FIG. 1, the visibility determination system 1 may include one or more cameras 10 that may image an imaging target and a computer that may process an image taken by the camera 10. The camera 10 may be any camera if it is capable of imaging the imaging target. In the first embodiment, an omnidirectional camera using a fisheye lens is installed in order to image a wide range including the imaging target around a camera installation location with one camera. The omnidirectional camera may be installed sideways along a horizontal direction so as to image one or more imaging targets in a particular direction. A first omnidirectional camera facing a first direction and a second omnidirectional camera facing a direction opposite to the first direction may be installed back to back. FIG. 2 illustrates an imaging target (S1) in a first image G1 and an image G3 indicating an edge extracted from the first image G1. The first image G1 is an image taken by the camera 10. As illustrated in FIG. 2, in the first embodiment, an island that is photographed when imaging is performed toward the sea from the camera installation location is regarded as the imaging target S1. In an image obtained from the camera 10, a pixel in the image and its direction are known.

The camera 10 may not necessarily be an omnidirectional camera using a fisheye lens, and may be a non-omnidirectional camera capable of imaging in a specific direction. The omnidirectional camera may be installed vertically upward so as to simultaneously image the imaging targets in a plurality of places around.

[Data Generation System 2]

As illustrated in FIG. 1, the data generation system 2 may include an edge extractor 21, an averaging processing part 22, and a determination data generator 23. These parts (21 to 23) may be realized by cooperation between software and hardware by executing a program pre-stored in a memory by a processor in a computer equipped with a processor such as a CPU, a storage such as a memory, and various interfaces.

Figure 3:
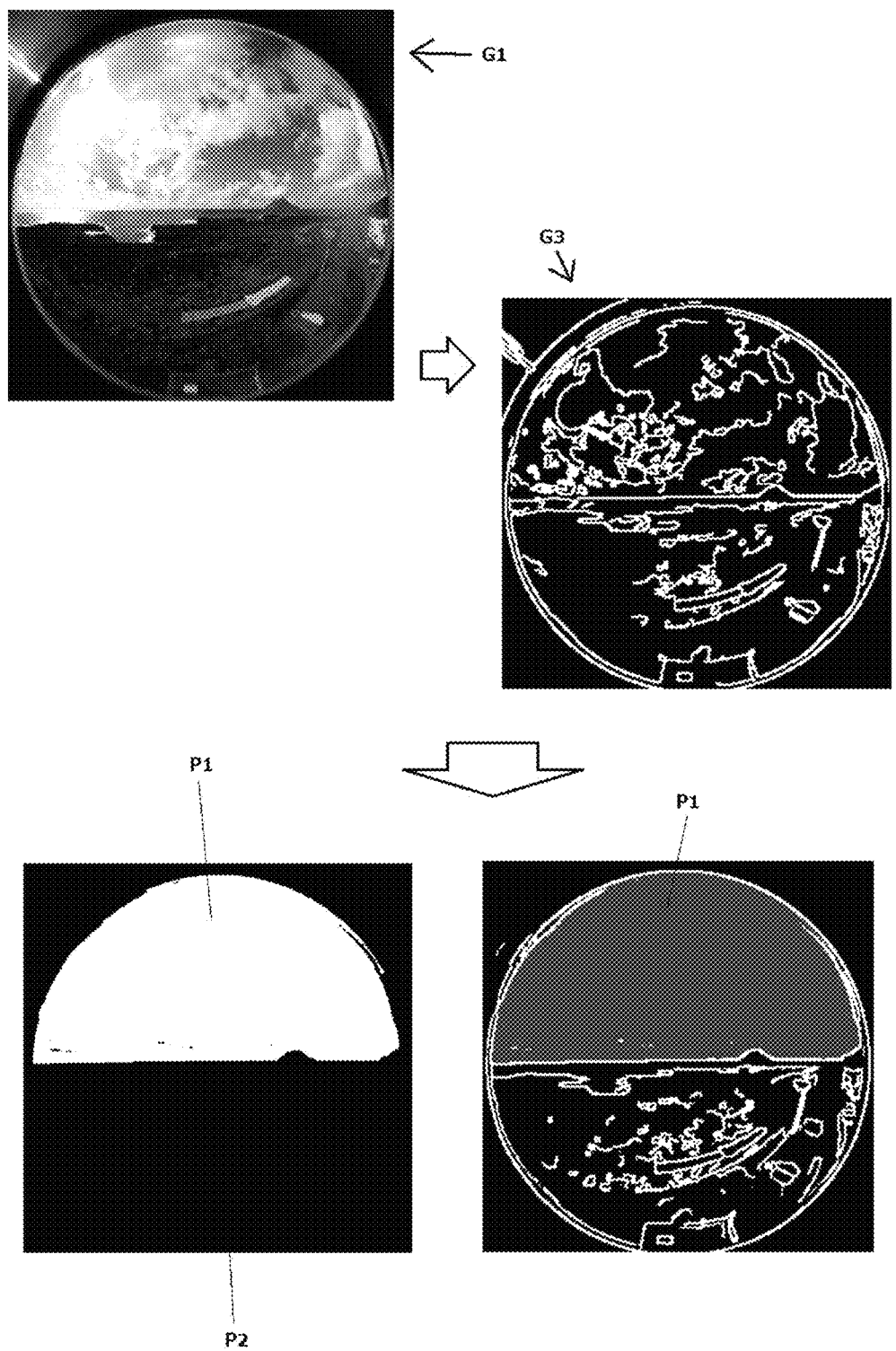
FIG. 3 is an explanatory diagram illustrating a first image, an image obtained by extracting the edge from the first image, a sky area, and a non-sky area.

The edge extractor 21 may extract an edge in the first image G1 taken by the camera 10, as illustrated in FIG. 2. If the first image G1 includes the imaging target S1 (island), the extracted edge will include an edge of the imaging target S1 (island). An edge is a portion of an image where there is an abrupt change in intensity between adjacent pixels, and the edge can be extracted by taking a difference in intensity between pixels. For example, as illustrated in FIG. 2, edge extraction processing may be executed on the first image G1 taken by the camera 10, and the image G3 indicating the edge may be obtained. In the image G3, a white portion may indicate the edge, and a black portion may indicate a portion other than the edge. If imaging is performed a plurality of times by the camera 10, a plurality of first images G1 that are chronologically continuous can be obtained. The first images G1 may be taken at regular time intervals or at random time intervals. FIG. 3 is an explanatory diagram illustrating the first image G1, the image G3 obtained by extracting the edge from the first image G1, a sky area P1, and a non-sky area P2. As illustrated in FIG. 3, the first image G1 may include the sky area P1 that may change depending on weather conditions and the non-sky area P2 (background portion) where a change depending on weather conditions cannot be observed or is difficult to observe. By obtaining the first images G1 taken at different times, it is possible to distinguish between the sky area P1 and the non-sky area P2. In the lower left image in FIG. 3, white may indicate the sky area P1 and black may indicate the non-sky area P2. In the lower right image of FIG. 3, gray may indicate the sky area P1, and other edges may indicate edges excluding that of the sky area P1. Although the first images G1 may not necessarily be chronologically continuous, the first images G1 are desired to be chronologically continuous as in the present embodiment.

The averaging processing part 22 may execute averaging processing on a plurality of images G3 obtained by extracting the edge from the first images G1 illustrated in FIG. 2 to FIG. 3 that are chronologically continuous. By the averaging processing, it is possible to distinguish between the sky area P1 and the non-sky area P2. As a specific example, for each image G3 (1 frame), processing may be performed in which one point value is added for a pixel of a portion having an edge and no point value is added for a pixel of a portion having no edge. If this processing is executed on the images G3, it can be identified that a pixel of a portion having a relatively low point value is the sky area P1 and a pixel of a portion having a relatively high point value is the non-sky area P2.

The determination data generator 23 may generate the determination data. The determination data is data used in the visibility determination system 1 and may include a first extracted image T1 and a filter 24.

Figure 4:
FIG. 4 is an explanatory diagram relating to processing configured to extract a first area including an edge of an imaging target (island) from the edge-extracted first image.
Figure 4:
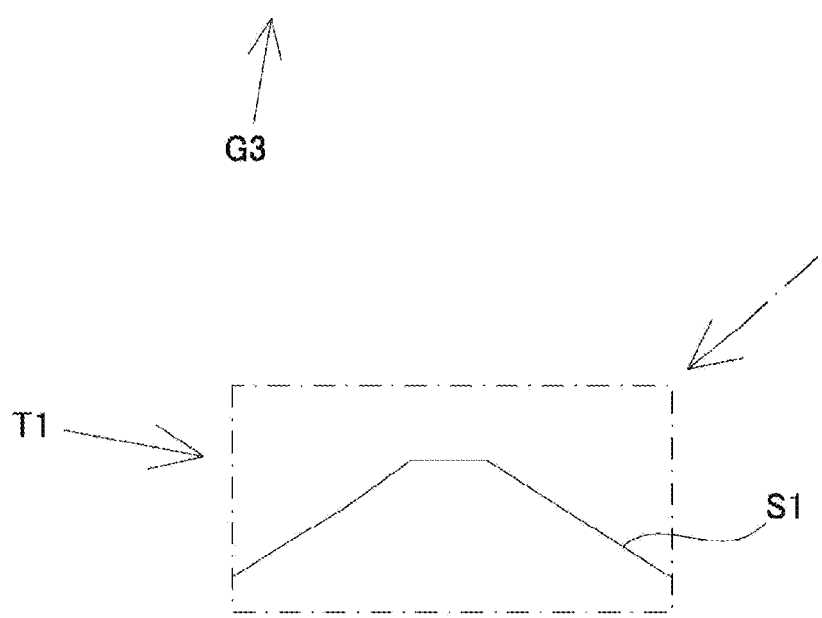

FIG. 4 is an explanatory diagram relating to processing configured to extract a first area Ar1 including the edge of the imaging target S1 (island) from the edge-extracted first image G1 (image G3 indicating the extracted edge). As illustrated in FIG. 4, the first extracted image T1 is an image obtained by extracting the first area Ar1 including the edge of the imaging target S1 (island) from the edge-extracted first image G1 (image G3 indicating the extracted edge) in which the entire imaging target S1 (island) is photographed. The first extracted image T1 is an image serving as a reference for comparison, and may be stored in a storage 1a of the visibility determination system 1. The first area Ar1 may be an area extracted based on a shape of an outline of a sky area in an image. In the example of FIG. 2, an outline of the imaging target S1 (island) may constitute a portion of the outline of the sky area. The outline of the sky area is likely to be covered and is likely to change depending on weather conditions, and is effective in determining the visibility. Coordinates of the first area Ar1 can be expressed by coordinates in the image G3.

Figure 5:
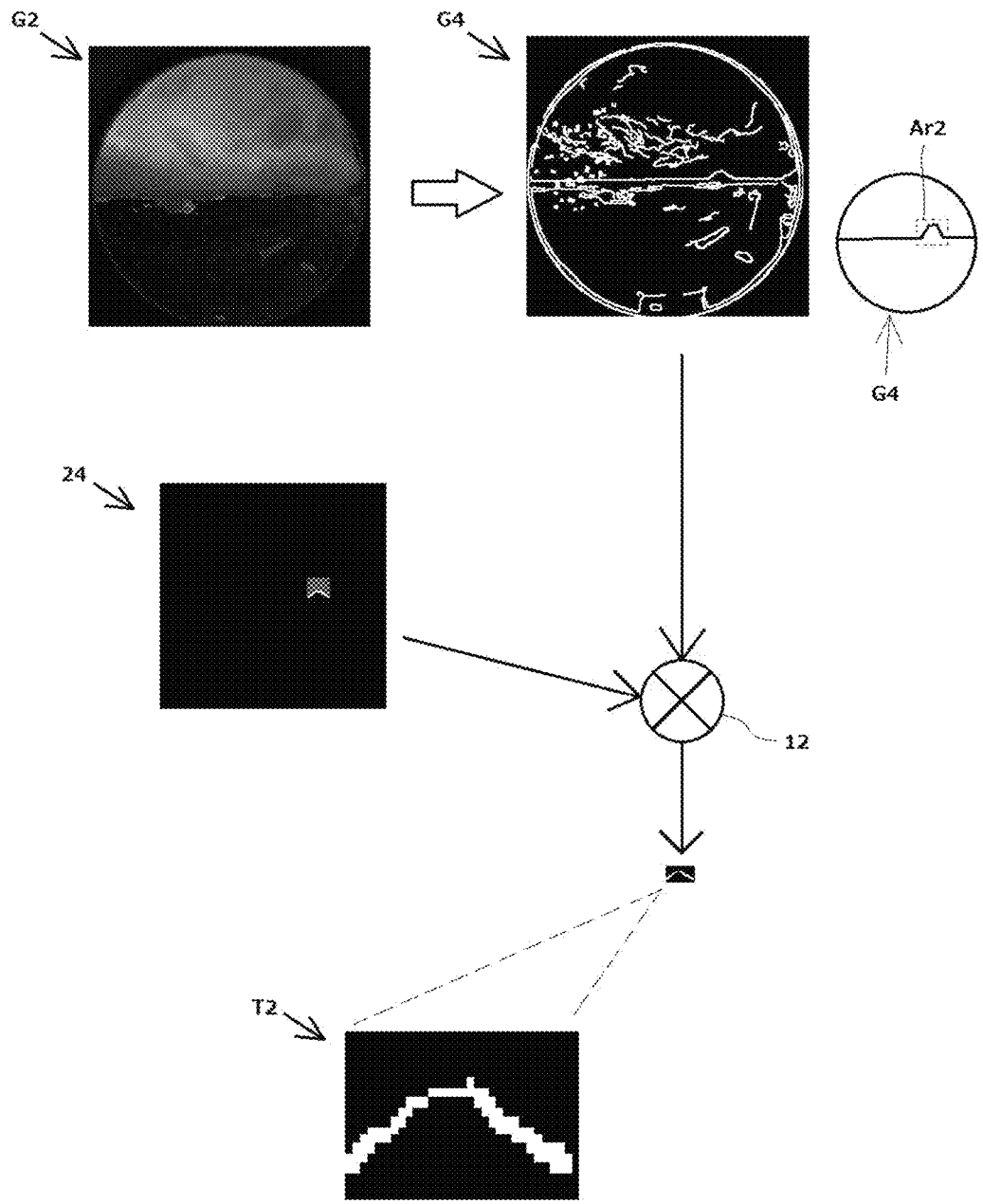
FIG. 5 is an explanatory diagram relating to processing configured to generate a second extracted image by using a second image, the edge-extracted second image, and a filter.

FIG. 5 is an explanatory diagram relating to processing configured to generate a second extracted image T2 by using a second image G2, the edge-extracted second image G2 (image G4 indicating the edge), and the filter 24. As illustrated in FIG. 5, the filter 24 is data used to extract a second area Ar2 (described later) corresponding to the first area Ar1 from the second image G2 taken by the camera 10. The second image G2 is an image that may be compared with the first extracted image T1 and may serve as a target for determining the visibility, and is an image taken by the camera 10 at a different time from the first image G1. The filter 24 may be generated based on the coordinates of the first area Ar1 in the first image G1, the sky area P1 and the non-sky area P2. As an example, the filter 24 may be configured to extract only the edge in the first area Ar1 including the edge of the imaging target S1 (island) and a peripheral area of the edge of the imaging target S1 (island). The filter 24 may be stored in the storage 1a of the visibility determination system 1.

[Visibility Determination System 1]

As illustrated in FIG. 1, the visibility determination system 1 may include an edge extractor 11, an area extractor 12, an acquisition part 13, and a determination part 14. These parts (11 to 14) may be realized by cooperation between software and hardware by executing a program pre-stored in the storage 1a by a processor 1b (processing circuitry) in a computer equipped with the processor 1b such as a CPU, the storage 1a such as a memory, and various interfaces.

The edge extractor 11 may have the same function as the edge extractor 21 of the data generation system 2. The edge extractor 11 may extract an edge in the second image G2 taken by the camera 10 and obtain the image G4 indicating the edge. If the second image G2 includes an imaging target (island), the extracted edge will include an edge of the island as the imaging target.

As illustrated in FIG. 5, the area extractor 12 may extract the second area Ar2 corresponding to the first area Ar1 from the edge-extracted second image G2 (image G4 indicating the edge). The second area Ar2 is a portion of the edge-extracted second image G2 (image G4). A positional relationship of the second area Ar2 with respect to the image G4 is the same as a positional relationship of the first area Ar1 with respect to the image G3. The area extractor 12 may extract the second area Ar2 from the edge-extracted second image G2 (image G4) by using the filter 24 stored in the storage 1a. As illustrated in FIG. 5, by applying the filter 24 to the edge-extracted second image G2 (image G4), the second extracted image T2 including the second area Ar2 may be obtained. If the visibility is good, the second extracted image T2 may include the edge of the imaging target S1 (island). On the other hand, if the visibility is not good, the second extracted image T2 may not include the edge of the imaging target S1 (island), or may include a smaller amount of the edge of the imaging target S1 (island) than when the visibility is good.

The acquisition part 13 may acquire the first extracted image T1 stored in the storage 1a. The storage 1a may be, but is not limited to, a memory in the same computer as the processor 1b. For example, the storage 1a may be an external storage device in a different computer from that includes the processor 1b, and the acquisition part 13 may acquire the first extracted image T1 via a communication network.

The determination part 14 may determine the visibility based on the first extracted image T1 including the first area Ar1 and the second extracted image T2 including the second area Ar2. In the first embodiment, the determination part 14 may include a clarity calculator 14a, and may be configured capable of calculating a clarity index of the visibility as a determination result. The clarity calculator 14a may calculate the clarity index of the visibility based on a ratio of the number of pixels of the second area Ar2 in the second extracted image T2 to the number of pixels of the first area Ar1 in the first extracted image T1. Specifically, the clarity calculator 14a may calculate, as the clarity index of the visibility, the number of pixels of the extracted edge of the second area Ar2 divided by the number of pixels of the edge in the first extracted image T1 (the number of pixels of the first area). If the clarity index is greater than or equal to a particular value (for example, 0.8 for an index value and 80% for a ratio), the determination part 14 may determine the visibility to be good; if the clarity index is less than the particular value, the determination part 14 may determine the visibility to be poor.

A notifier 15 may be configured capable of outputting a warning signal in the case where the clarity index calculated by the determination part 14 is lower than a particular clarity index threshold (for example, 30% in terms of ratio). Accordingly, in the case where the calculated clarity index is lower than the threshold, since it means that the imaging target S1 is covered by clouds or the like and cannot be visually recognized, it cannot be said that the visibility is good, and it makes sense to output the warning signal for notification. The particular clarity index threshold may be set in advance or may be user set.

Figure 6:
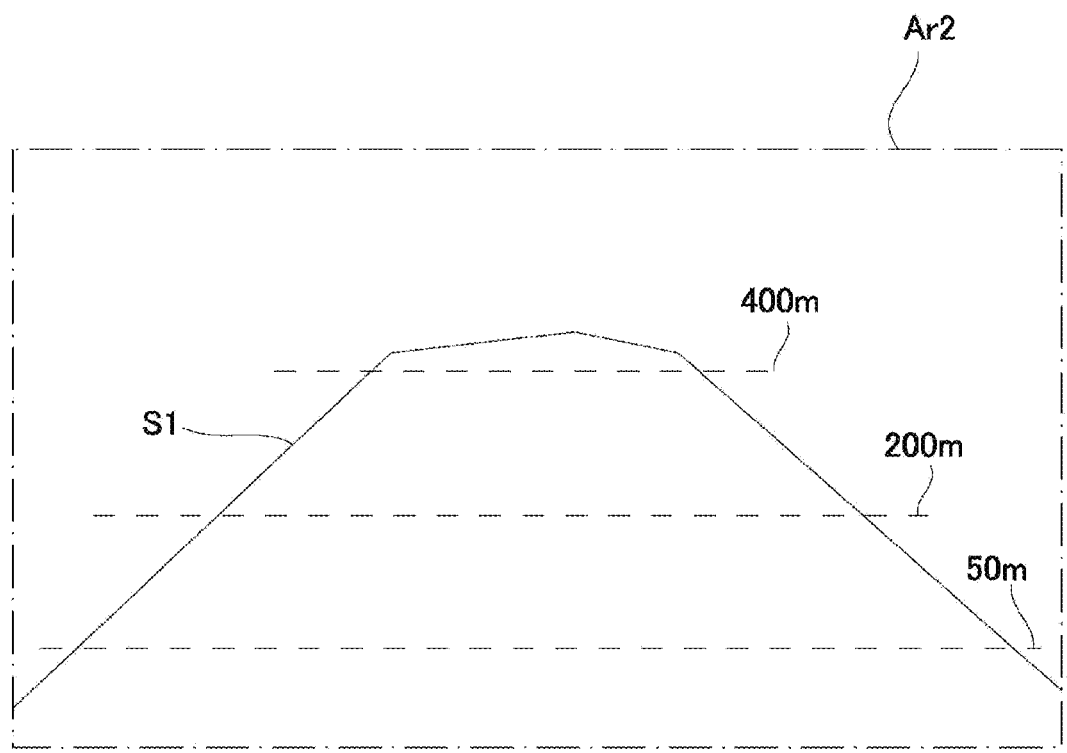
FIG. 6 illustrates an imaging target in a second area and known height.

The determination part 14 may determine the visibility at a plurality of heights of a terrain. FIG. 6 illustrates the imaging target S1 in the second area Ar2 and known height. The same applies to the first area Ar1. For example, in the case of the imaging target S1 (island) illustrated in FIG. 2, as illustrated in FIG. 6, the height of the terrain in the second area Ar2 is known to the determination part 14. In the example of FIG. 6, the presence or absence of the edge of the imaging target S1 may be determined at each of three heights including 400 m, 200 m, and 50 m in accordance with the shape of the imaging target S1, and the visibility at each height may be determined. A display part 16 may display a determination result (including a poor visibility area) based on the visibility corresponding to a plurality of heights of the terrain.

Figure 7:
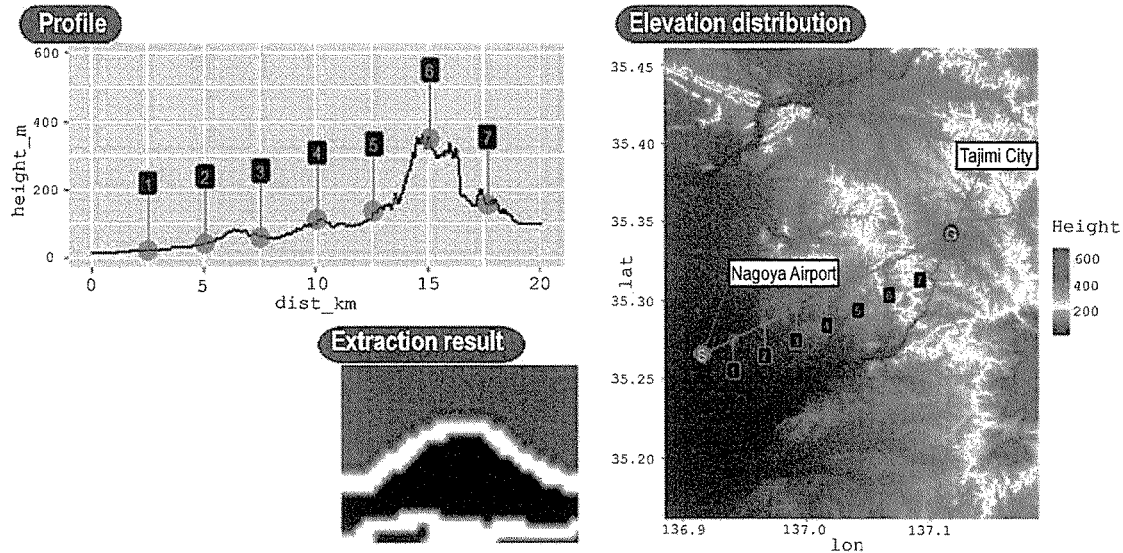
FIG. 7 illustrates an example of a display mode of a display part.
Figure 7:
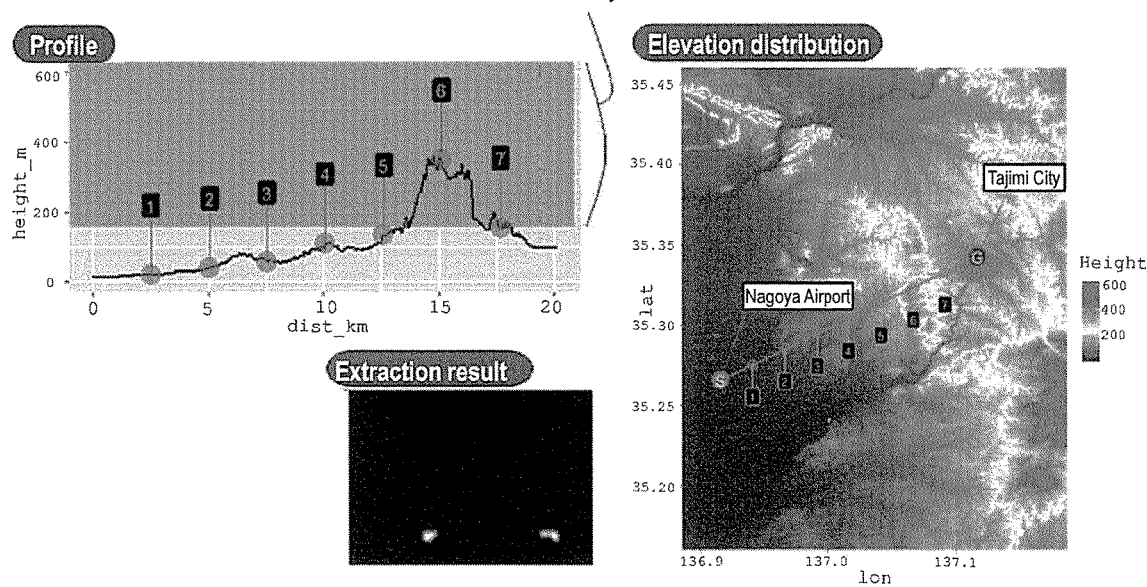

FIG. 7 illustrates an example of a display mode of the display part 16. As illustrated in FIG. 7, the display part 16 may be capable of displaying an elevation distribution on a map, a profile of a terrain to be evaluated, a second extracted image that is an extraction result, and the determination result (including the poor visibility area) of the visibility altogether. On the map, a start point may be indicated by "S", a destination point may be indicated by "G", and a plurality of places on a straight line from the start point to the destination point may be indicated by numbers (1 to 7). The numbers (1 to 7) on the map may correspond to numbers (1 to 7) in the profile. The upper portion of FIG. 7 illustrates an example of good visibility when sunny, and no poor visibility area is illustrated. The lower portion of FIG. 7 illustrates an example of poor visibility at some heights when cloudy, and an area at a height of 180 m or more is displayed to be the poor visibility area.

Figure 8:
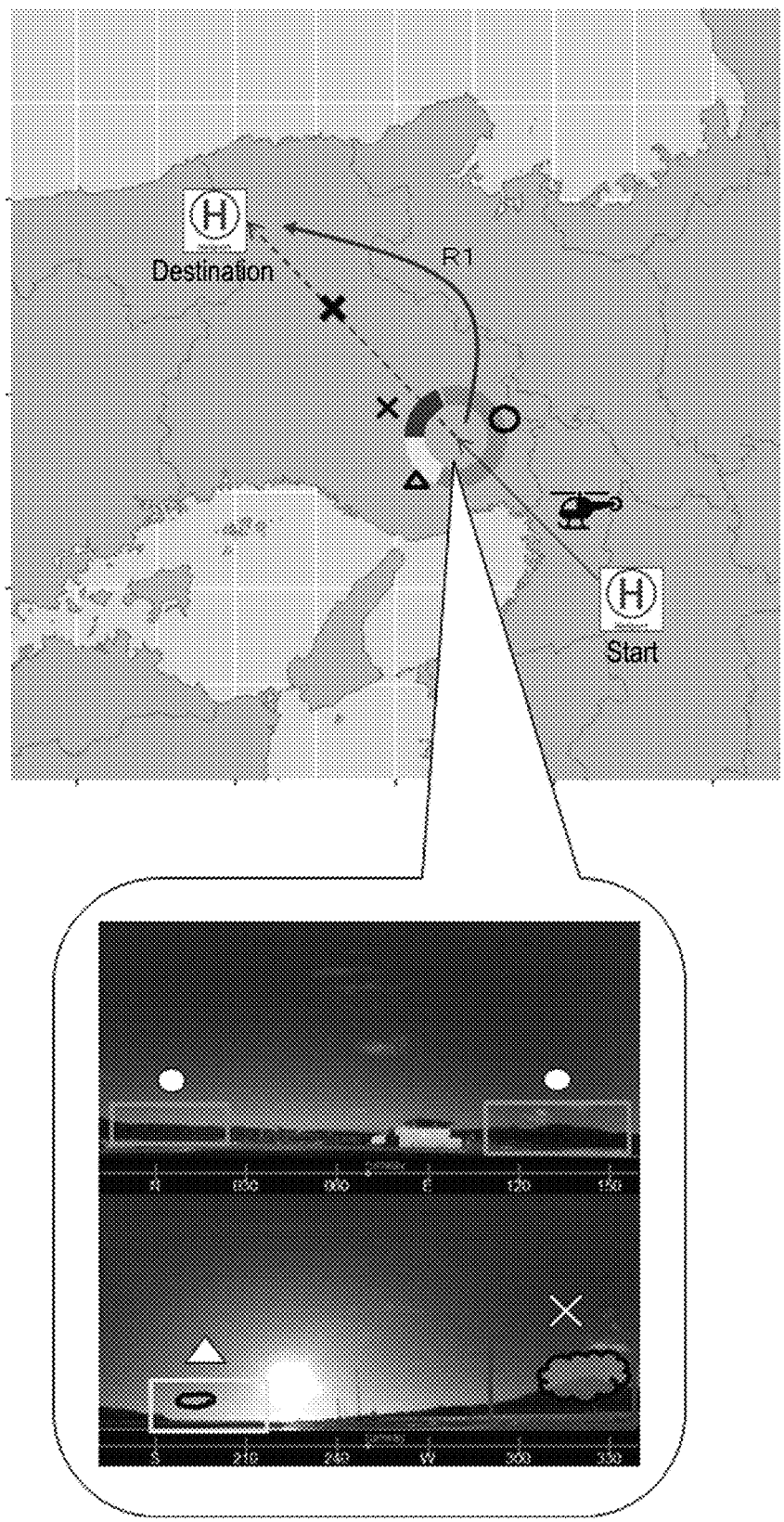
FIG. 8 illustrates an example of generating a detour route based on an image of a camera installed between a start point and a destination point of an aircraft.

As illustrated in FIG. 1, a detour route generator 17 may be provided. If the detour route generator 17 is provided, a camera may be capable of imaging 360 degrees around. The shape of an outline of a sky area may be set as an imaging target, and a first area including an edge of the imaging target may be set for each direction. The imaging target may include a large number of boundaries between the surrounding mountains and the sky. The clarity index may be calculated for each direction in which the imaging target is set. If the outline of the sky area as the imaging target cannot be extracted, it may be determined that the visibility is poor; if the outline of the sky area as the imaging target can be extracted, it may be determined that the visibility is good. FIG. 8 illustrates an example of generating a detour route based on an image of the camera 10 installed between a start point and a destination point of an aircraft. The lower portion of FIG. 8 illustrates an image in which an image taken by a fisheye camera is panoramically developed into 360 degrees. The upper portion of FIG. 8 illustrates a map, on which a visibility determination result by the camera is indicated by a circle, a triangle, or a cross. Although going northwest is the shortest route at the camera installation location, the shortest route cannot be adopted due to poor visibility (indicated by a cross in FIG. 8). The determination part 14 may determine that the visibility toward the north, the east, and the south is good based on an image of the camera. Thus, the detour route generator 17 may generate a planned route of a moving body based on a determination result of the determination part 14 based on the second image G2 obtained from the camera. In the example of FIG. 8, a route R1 via the north may be generated.

Figure 9:
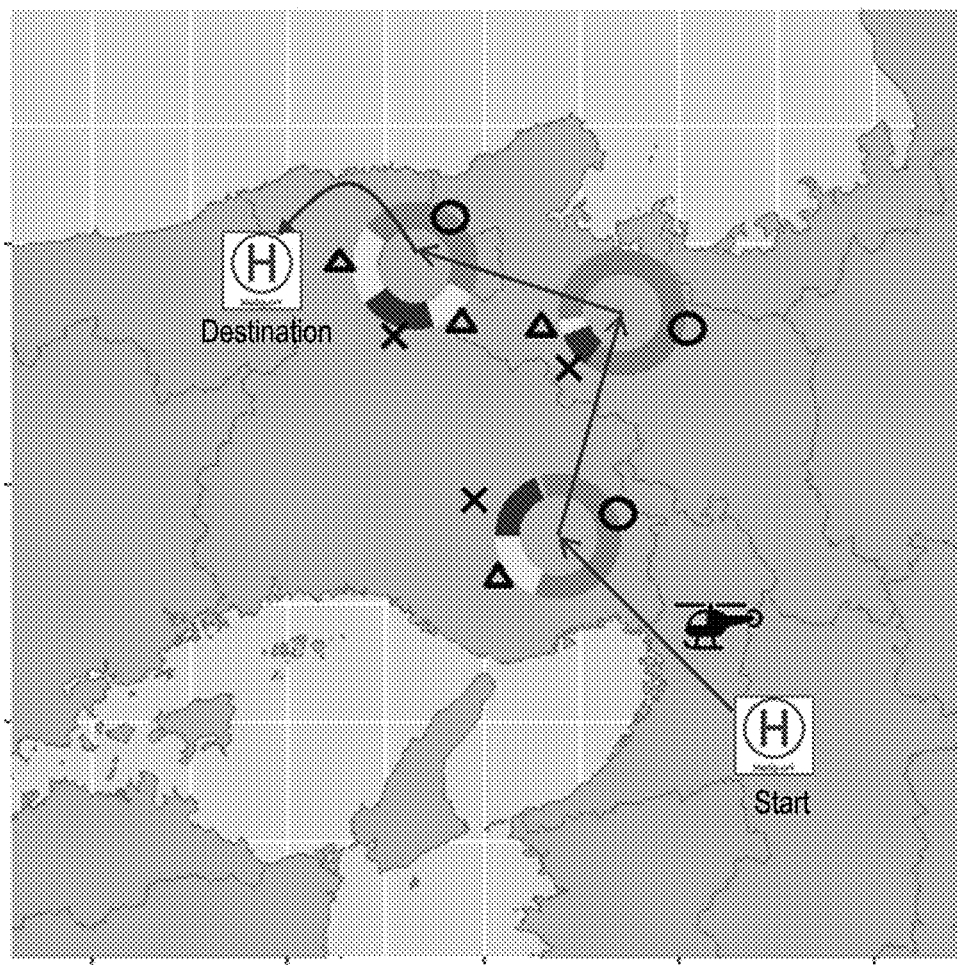
FIG. 9 is an explanatory diagram relating to another detour route.

The determination part 14 may also be as illustrated in FIG. 9. FIG. 9 is an explanatory diagram relating to another detour route. The determination part 14 may determine the visibility of the surroundings for each second image G2 obtained from a plurality of cameras installed at mutually different locations. The detour route generator 17 may generate the planned route of the moving body based on the visibility from the second image G2 at each location. If a plurality of candidate routes are generated, a shortest detour route may be generated.

[Method]

Figure 10:
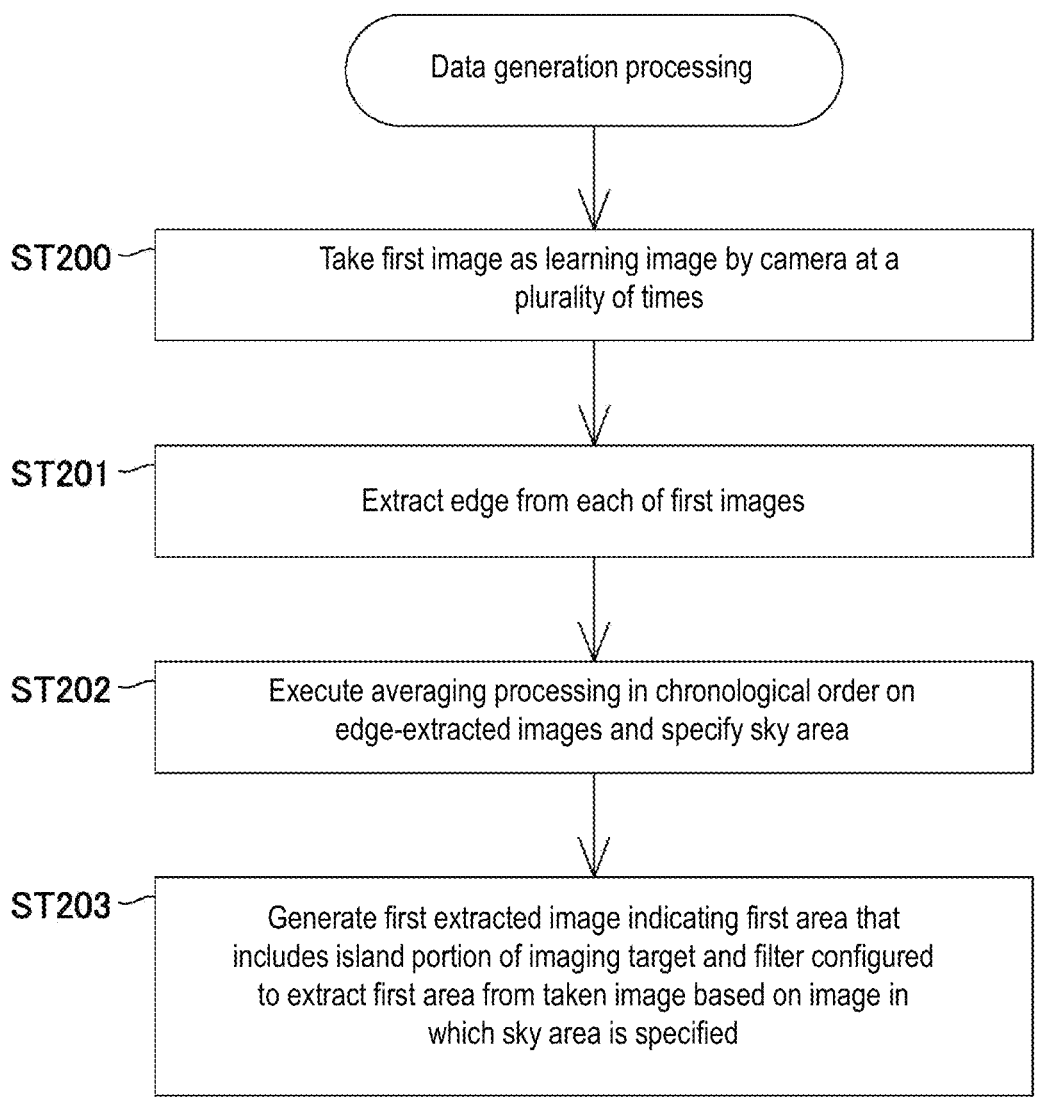
FIG. 10 is a flowchart illustrating data generation processing executed by a data generation system of the first embodiment.
Figure 11:
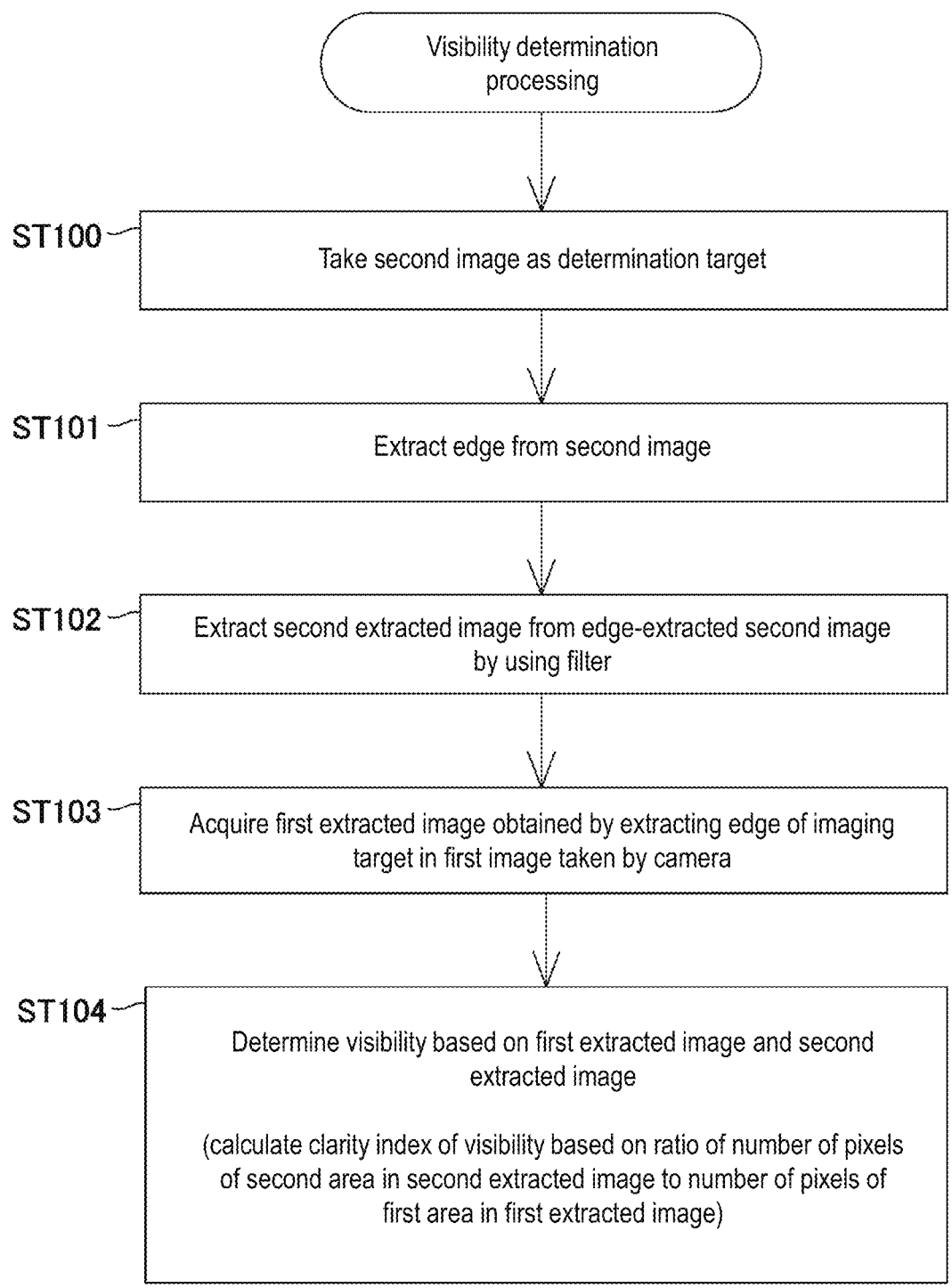
FIG. 11 is a flowchart illustrating processing executed by the visibility determination system of the first embodiment.

An information processing method executed by the visibility determination system 1 and the data generation system 2 will be described with reference to FIG. 10 and FIG. 11. FIG. 10 is a flowchart illustrating data generation processing executed by the data generation system 2 of the first embodiment. FIG. 11 is a flowchart illustrating visibility determination processing executed by the visibility determination system 1 of the first embodiment.

The data generation processing is described. In step ST200 illustrated in FIG. 10, the camera 10 may take the first image G1 as a learning image at a plurality of times. In step ST201, the edge extractor 21 may perform edge extraction on each of a plurality of first images G1. In step ST202, the averaging processing part 22 may execute averaging processing in chronological order on the images that have been edge-extracted and may specify a sky area. In step ST203, based on an image in which the sky area is specified, the determination data generator 23 may generate the first extracted image T1 indicating the first area Ar1 that includes an island portion of the imaging target S1 and the filter 24 configured to extract the first area Ar1 from a taken image.

The visibility determination processing is described. In step ST100 illustrated in FIG. 11, the camera 10 may take the second image G2 as a determination target. The second image G2 may be taken at a different time from the first image G1. In step ST101, the edge extractor 11 may extract an edge in the second image G2. In step ST102, the area extractor 12 may extract the second extracted image T2 from the edge-extracted second image G2 by using the filter 24. The second extracted image T2 may include the second area Ar2 that may include the edge of the imaging target S1. In step ST103, the acquisition part 13 may acquire the first extracted image T1 obtained by extracting the edge of the imaging target S1 in the first image G1 taken by the camera 10. In step ST104, the determination part 14 may determine the visibility based on the first extracted image T1 and the second extracted image T2. Specifically, the clarity calculator 14a constituting the determination part 14 may calculate the clarity index of the visibility based on a ratio of the number of pixels of the second area Ar2 in the second extracted image T2 to the number of pixels of the first area Ar1 in the first extracted image T1.

In the above embodiment, the imaging target is a natural object such as an island, a mountain, or an outline of a sky area. However, the disclosure is not limited thereto. For example, the imaging target may be a structure such as a building or a tower fixed on the ground.

As described above, as in the first embodiment, the visibility determination system 1 is a system configured to determine a visibility condition based on an image taken by the camera 10. The visibility determination system 1 may include: the acquisition part 13, configured to acquire the first extracted image T1 obtained by extracting the edge of the imaging target S1 in the first image G1 taken by the camera 10; and the determination part 14, configured to determine the visibility based on the first extracted image T1 and the second extracted image T2 that is obtained by extracting the edge of the imaging target S1 in the second image G2 taken by the camera 10 at a different time from the first image G1.

According to this configuration, since the first extracted image T1 and the second extracted image T2 obtained by extracting the edge of the imaging target S1 from the first image G1 and the second image G2 taken at different times by the same camera 10 are used, it is possible to determine the visibility.

As in the first embodiment, a visibility determination method may include the following. The first extracted image T1 obtained by extracting the edge of the imaging target S1 in the first image G1 taken by the camera 10 is acquired. The visibility is determined based on the first extracted image T1 and the second extracted image T2 that is obtained by extracting the edge of the imaging target S1 in the second image G2 taken by the camera 10 at a different time from the first image G1.

Although not particularly limited, as in the system of the first embodiment, the first extracted image T1 may be generated by averaging a plurality of edge-extracted first images G1 (images G3).

The first images G1 may include not only the background but also a temporal change in a body covering the imaging target S1. Since the first extracted image T1 that appropriately reflects the temporal change can be generated by averaging the first images G1, and the first extracted image T1 that has been on site is used, it is possible to improve determination accuracy.

Although not particularly limited, as in the system of the first embodiment, the first extracted image T1 may be generated by extracting the first area Ar1 that is a portion of the edge-extracted first image G1 and that includes the edge of the imaging target S1. The visibility determination system 1 may further include the area extractor 12 configured to extract the second area Ar2 that is a portion of the edge-extracted second image G2 and that corresponds to the first area Ar1. The determination part 14 may determine the visibility based on the first extracted image T1 including the first area Ar1 and the second extracted image T2 including the second area Ar2 extracted by the area extractor 12.

In this way, since the first area Ar1 includes the edge of the imaging target S1 and is a portion of the first image G1, and the second area Ar2 may include the edge of the imaging target S1 and is a portion of the second image G2, it is possible to improve determination accuracy.

Although not particularly limited, as in the first embodiment, the first area Ar1 may be an area extracted based on the shape of the outline of the sky area in the first image G1.

According to this configuration, it is possible to specify a position of an imaging target such as a cloud in the sky, the horizon adjacent to the sky, a mountain and an island, and to extract the first area Ar1. Since these imaging targets are included in the second area Ar2 and are likely to be affected by the weather, it is possible to improve determination accuracy of the visibility.

Although not particularly limited, as in the system of the first embodiment, the clarity calculator 14a may be provided configured to calculate the clarity index of the visibility based on the ratio of the number of pixels of the second area Ar2 in the second extracted image T2 to the number of pixels of the first area Ar1 in the first extracted image T1.

The visibility may be expressed by the clarity index, which is useful.

Although not particularly limited, as in the system of the first embodiment, the notifier 15 may be provided configured to output the warning signal in the case where the clarity index calculated by the clarity calculator 14a is lower than the particular clarity index threshold.

Since the warning signal is output from the system when the visibility becomes poor, automatic monitoring can be realized compared to manual monitoring, which is useful.

Although not particularly limited, as in the system of the first embodiment, a planned route of a moving body may be generated based on the visibility from the second image G2 obtained from a plurality of cameras 10 installed at mutually different locations.

It is possible to provide the planned route of the moving body in consideration of the visibility.

Although not particularly limited, as in the system of the first embodiment, the determination part 14 may determine the visibility at a plurality of heights of a terrain.

According to this configuration, the visibility may be determined at a plurality of heights of the terrain, which is useful.

Although not particularly limited, as in the system of the first embodiment, the display part 16 may be provided configured to display the poor visibility area based on the visibility corresponding to a plurality of heights of the terrain.

According to this configuration, since the poor visibility area can be understood corresponding to a plurality of heights of the terrain, the disclosure is useful.

Although not particularly limited, as in the first embodiment, the imaging target may include a natural object or a structure fixed on the ground.

The imaging target can be anything if its positional relationship with the camera does not change, which is useful for application of visibility determination.

Although not particularly limited, as in the first embodiment, the visibility determination system 1 may further include the camera 10.

A program according to the present embodiment is a program that may cause one or more processors to execute the above method. That is, the program according to the present embodiment may cause one or more processors to execute the following. A first extracted image obtained by extracting an edge of an imaging target in a first image taken by a camera is acquired. Visibility is determined based on the first extracted image and a second extracted image that is obtained by extracting the edge of the imaging target in a second image taken by the camera at a different time from the first image. A temporary computer-readable recording medium according to the present embodiment may store the above program.

Although the embodiments of the disclosure have been described above with reference to the drawings, it should be considered that the specific configuration is not limited to these embodiments. The scope of the disclosure is defined not only by the above description of the embodiments but also the claims, and further includes all modifications within the scope of the claims and the equivalents thereof.

For example, the operations, procedures, steps, and stages of each processing performed by an apparatus, system, program, and method illustrated in the claims, specification, and drawings can be performed in any order as long as the output from previous processing is not used in later processing. Even if a process flow is described using phrases such as "first" or "next" in the claims, specification, and drawings, it does not necessarily mean that the process must be performed in this order.

Each part (11 to 17, 21 to 23) illustrated in FIG. 1 is realized by executing a particular program by one or more processors. However, each part may be composed of a dedicated memory or a dedicated circuit.

In the system of the above embodiments, each part is mounted on the processor 1b of one computer. However, each part may be distributedly mounted on a plurality of computers or the cloud. That is, the above method may be executed by one or more processors.

In FIG. 1, the visibility determination system 1 and the data generation system 2 are mounted separately. However, the disclosure is not limited thereto. For example, each part constituting the data generation system 2 may be incorporated into the visibility determination system 1.

A structure adopted in each of the above embodiments may be adopted in any other embodiment. In FIG. 1, each part (11 to 17) is mounted for convenience of description. However, some of them may be arbitrarily omitted. For example, the notifier 15, the display part 16, and the detour route generator 17 may be optionally provided.

The specific configuration of each part is not limited to the above embodiments, and various modifications can be made without departing from the gist of the disclosure.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A visibility determination system configured to determine a visibility condition based on an image taken by a camera, comprising:
processing circuitry configured to:
acquire a first extracted image obtained by extracting an edge of an imaging target in a first image taken by the camera that is installed at a stationary location;
determine visibility based on the first extracted image and a second extracted image that is obtained by extracting the edge of the imaging target in a second image taken by the camera that is installed at the stationary location at a different time from the first image;
generate the first extracted image by extracting a first area being a portion of the first image that has been edge-extracted and comprising the edge of the imaging target;
extract a second area being a portion of the second image that has been edge-extracted and corresponding to the first area;
determine the visibility based on the first extracted image comprising the first area and the second extracted image comprising the second area; and
calculate a clarity index of the visibility based on a ratio of number of pixels of the second area in the second extracted image to number of pixels of the first area in the first extracted image.

2. The visibility determination system according to claim 1, wherein the processing circuitry is further configured to:
generate the first extracted image by averaging a plurality of the first images that have been edge-extracted.

3. The visibility determination system according to claim 1, wherein the processing circuitry is further configured to:
extract the first area based on a shape of an outline of a sky area in the first image.

4. The visibility determination system according to claim 1, wherein the processing circuitry is further configured to:
    output a warning signal in response to the clarity index being lower than a clarity index threshold.

5. The visibility determination system according to claim 1, wherein the processing circuitry is further configured to:
    generate a planned route of a moving body based on the visibility from the second image obtained from a plurality of cameras installed at mutually different locations.

6. The visibility determination system according to claim 1, wherein the processing circuitry is further configured to:
    determine the visibility at a plurality of heights of a terrain.

7. The visibility determination system according to claim 1, wherein the processing circuitry is further configured to:
    display a poor visibility area based on the visibility corresponding to a plurality of heights of a terrain.

8. The visibility determination system according to claim 1, wherein
    the imaging target comprises a natural object or a structure fixed on ground.

9. The visibility determination system according to claim 1, further comprising the camera.

10. The visibility determination system according to claim 2, wherein the processing circuitry is further configured to:
    extract the first area based on a shape of an outline of a sky area in the first image.

11. The visibility determination system according to claim 2, wherein the processing circuitry is further configured to:
    output a warning signal in response to the clarity index being lower than a clarity index threshold.

12. The visibility determination system according to claim 11, wherein the processing circuitry is further configured to:
    generate a planned route of a moving body based on the visibility from the second image obtained from a plurality of cameras installed at mutually different locations.

13. The visibility determination system according to claim 12, wherein the processing circuitry is further configured to:
    determine the visibility at a plurality of heights of a terrain.

14. The visibility determination system according to claim 13, wherein the processing circuitry is further configured to:
    display a poor visibility area based on the visibility corresponding to a plurality of heights of a terrain.

15. A visibility determination method comprising:
    acquiring a first extracted image obtained by extracting an edge of an imaging target in a first image taken by a camera that is installed at a stationary location;
    determining visibility based on the first extracted image and a second extracted image that is obtained by extracting the edge of the imaging target in a second image taken by the camera that is installed at the stationary location at a different time from the first image;
    generating the first extracted image by extracting a first area being a portion of the first image that has been edge-extracted and comprising the edge of the imaging target;
    extracting a second area being a portion of the second image that has been edge-extracted and corresponding to the first area;
    determining the visibility based on the first extracted image comprising the first area and the second extracted image comprising the second area; and
    calculating a clarity index of the visibility based on a ratio of number of pixels of the second area in the second extracted image to number of pixels of the first area in the first extracted image.

16. A non-transitory computer-readable medium having stored thereon computer-executable instructions which, when executed by a computer, cause the computer to:
    acquire a first extracted image obtained by extracting an edge of an imaging target in a first image taken by a camera that is installed at a stationary location;
    determine visibility based on the first extracted image and a second extracted image that is obtained by extracting the edge of the imaging target in a second image taken by the camera that is installed at the stationary location at a different time from the first image;
    generate the first extracted image by extracting a first area being a portion of the first image that has been edge-extracted and comprising the edge of the imaging target;
    extract a second area being a portion of the second image that has been edge-extracted and corresponding to the first area;
    determine the visibility based on the first extracted image comprising the first area and the second extracted image comprising the second area; and
    calculate a clarity index of the visibility based on a ratio of number of pixels of the second area in the second extracted image to number of pixels of the first area in the first extracted image.

* * * * *